(12) United States Patent
Naganuma et al.

(10) Patent No.: US 8,086,268 B2
(45) Date of Patent: Dec. 27, 2011

(54) MOBILE COMMUNICATION TERMINAL AND METHOD OF CONTROLLING TRANSMISSION CHARACTERISTIC THEREOF

(75) Inventors: Yusuke Naganuma, Kanagawa (JP); Kazuki Nagashima, Chiba (JP); Go Sakamoto, Tokyo (JP); Hiroyuki Matsumoto, Kanagawa (JP); Akihiro Bungo, Tokyo (JP); Tatsuhiro Kodama, Tokyo (JP); Tetsuo Umeda, Kanagawa (JP); Takahiro Sato, Tokyo (JP); Yoshitaka Onuma, Tokyo (JP)

(73) Assignee: Sony Ericsson Mobile Communications Japan, Inc., Tokyo (JP)

(*) Notice: Subject to any disclaimer, the term of this patent is extended or adjusted under 35 U.S.C. 154(b) by 484 days.

(21) Appl. No.: 12/412,852

(22) Filed: Mar. 27, 2009

(65) Prior Publication Data

US 2009/0253459 A1    Oct. 8, 2009

(30) Foreign Application Priority Data

Apr. 2, 2008    (JP) .................... 2008-096663

(51) Int. Cl.
*H04B 1/38* (2006.01)

(52) U.S. Cl. .................. 455/557; 455/550.1; 455/127.1
(58) Field of Classification Search .............. 455/127.1, 455/550.1, 557
See application file for complete search history.

(56) References Cited

U.S. PATENT DOCUMENTS 7,177,667 B2 * 2/2007 Kim .............................. 455/561
2009/0275281 A1 * 11/2009 Rosen ............................. 455/1

FOREIGN PATENT DOCUMENTS

JP    2005-160022    6/2005

* cited by examiner

*Primary Examiner* — Long Nguyen
(74) *Attorney, Agent, or Firm* — Oblon, Spivak, McClelland, Maier & Neustadt, L.L.P.

(57) ABSTRACT

A mobile communication terminal includes: a signal transmission section having a predetermined default value for a transmission characteristic; an antenna to be used at least by the signal transmission section; a separate circuit section sharing ground with the signal transmission section and the antenna, and being different from the signal transmission section; a monitoring section monitoring a change in a use state of the terminal related to the separate circuit section; and when the signal transmission section transmits a signal using the antenna, if the monitoring section detects a change in the use state of the terminal, a transmission-characteristic adjusting section adjusting a transmission characteristic of the signal transmission section from the default value to a characteristic optimized for the use state.

9 Claims, 6 Drawing Sheets

MOBILE COMMUNICATION TERMINAL AND METHOD OF CONTROLLING TRANSMISSION CHARACTERISTIC THEREOF

BACKGROUND OF THE INVENTION

1. Field of the Invention

The present invention relates to a mobile communication terminal, such as a mobile telephone terminal, etc., having a function of transmitting an FM radio wave, for example, and a method of controlling a transmission characteristic thereof.

2. Description of the Related Art

Recently, considerable progress has been made for mobile telephone terminals to have multiple functions. For example, some mobile telephone terminals having a transmitter, such as an FM transmitter, in addition to a transmitter/receiver for connecting to a mobile telephone network are being brought to the market.

Here, in general, a transmission level of a transmitter (FM transmitter, etc.) built in a mobile telephone terminal is specified in a state of a single mobile telephone terminal, that is to say, in a state of not being connected with various kinds of accessory devices, for example such as an earphone, a handsfree set, a battery charger, etc. Specifically, the transmission level is set so that a maximum transmission level is obtained within a range of not violating the Radio Law. Also, a transmission level, a frequency band, further, approval/disapproval of transmission, etc., of the transmitter, such as an FM transmitter, to be mounted on a mobile telephone terminal are set in accordance with a specification of each country.

In this regard, Japanese Unexamined Patent Application Publication No. 2005-160022 (FIG. 1) has disclosed a mobile telephone in which a connector of the mobile telephone is provided with a charging terminal and an antenna connection terminal, an external antenna cable is connected to the connector, and thereby a transmission/reception sensitivity of the mobile telephone has been improved, and charging the mobile telephone has become possible at the same time.

SUMMARY OF THE INVENTION

As described above, in a transmitter, such as an FM transmitter, etc., which is mounted on a mobile telephone terminal, a transmission level and a frequency band is set in a state of not being connected with an accessory device. Also, approval/disapproval of transmission, the transmission level and the frequency band etc., are set in accordance with a specification of each country.

Accordingly, for example, when an accessory device is connected to a mobile telephone terminal, and thus an antenna gain of the transmitter is changed, if the transmission level becomes greater than the level specified by the Radio Law, for example, it becomes necessary to take some action. On the contrary, for example when the transmission level falls and the signal transmission quality deteriorates by a change in the antenna gain at accessory connection time, availability for a user deteriorates, and thus some action becomes necessary. Also, for example, if a mobile telephone terminal produced for a certain country is brought in another country, the mobile telephone terminal might infringe (violate) the Radio Law of that country, and thus some action also becomes necessary in that case. Furthermore, for example, if a mobile telephone terminal including a transmitter whose transmission level is adjusted to a country having strict regulations is brought in a country having loose regulations, a transmission distance of the transmitter becomes shorter than mobile telephone terminals that are originally produced for that country (loose-regulation country). Thus, there is a problem in that a difference arises in the availability for the user (availability relatively deteriorates). In this case, some action also becomes necessary.

The present invention has been made in view of these circumstances. For example, in a mobile terminal provided with a transmitter, such as an FM transmitter, etc., it is desirable to allow taking effective measures even when a change occurs in a use state of the terminal, and thereby the terminal might violate regulations, such as the Radio Law. Also, it is desirable to provide a mobile communication terminal and a method of controlling a transmission characteristic which are capable of reducing a change in the availability for the user in such a case. The above-described change in the use state occurs, for example, when an accessory device is connected to the terminal or a use country of the terminal is changed, or the like.

According to an embodiment of the present invention, there is provided a mobile communication terminal including: a signal transmission section having a predetermined default value for a transmission characteristic; an antenna to be used at least by the signal transmission section; a separate circuit section sharing ground with the signal transmission section and the antenna, and being different from the signal transmission section; a monitoring section monitoring a change in a use state of the terminal related to the separate circuit section; and when the signal transmission section transmits a signal using the antenna, if the monitoring section detects a change in the use state of the terminal, a transmission-characteristic adjusting section adjusting a transmission characteristic of the signal transmission section from the default value to a characteristic optimized for the use state.

Also, according to another embodiment of the present invention, there is provided a method of controlling a transmission characteristic of a mobile communication terminal having a signal transmission section having a predetermined default value for a transmission characteristic, an antenna to be used at least by the signal transmission section, and a separate circuit section sharing ground with the signal transmission section and the antenna, and being different from the signal transmission section, the method including the steps of: a monitoring section monitoring a change in a use state of the terminal related to the separate circuit section; and when the signal transmission section transmits a signal using the antenna, if the monitoring section detects a change in the use state of the terminal, a transmission-characteristic adjusting section adjusting a transmission characteristic of the signal transmission section from the default value to a characteristic optimized for the use state.

That is to say, by the present invention, when there is a change in the transmission characteristic of the signal transmission section and the antenna because the use state of the terminal has changed, for example, in the case where an accessory device is connected to the terminal or the use country has changed, the transmission characteristic of the signal transmission section is best adjusted so as to offset the variation of the transmission characteristic caused by a change of the use state.

In the present invention, when there is a change in the transmission characteristic of the signal transmission section and the antenna because a use state of the terminal has changed, the transmission characteristic of the signal transmission section is best adjusted in order to offset the variation of the transmission characteristic caused by the change of the use state. Thus, in a mobile terminal provided with a transmitter, such as an FM transmitter, for example, it is possible to take effective measures when a change occurs in a use state of the terminal, and the terminal might violate regulations, such as the Radio Law. This situation occurs, for example, when an accessory device is connected to the terminal or a use country of the terminal is changed, or the like. Also, it is possible to allow reducing a change in the availability for the user in such a case.

DESCRIPTION OF THE PREFERRED EMBODIMENTS

In the following, a description will be given of a mobile terminal according to an embodiment of the present invention with reference to the drawings.

In this regard, in the present embodiment, a mobile telephone terminal having a built-in transmitter, such as an FM transmitter, is taken as an example of a mobile terminal according to an embodiment of the present invention. The descriptions that are given here are only examples as a matter of course. It goes without saying that the present invention is not limited to the examples. Also, a transmitter is not limited to an FM transmitter, and may be a transmitter for proximity radio communication, for example a so-called Bluetooth (registered trademark), an UWB (Ultra Wide Band) system, a wireless LAN (Local Area Network), etc.

Schematic Configuration of First Embodiment

Figure 1:
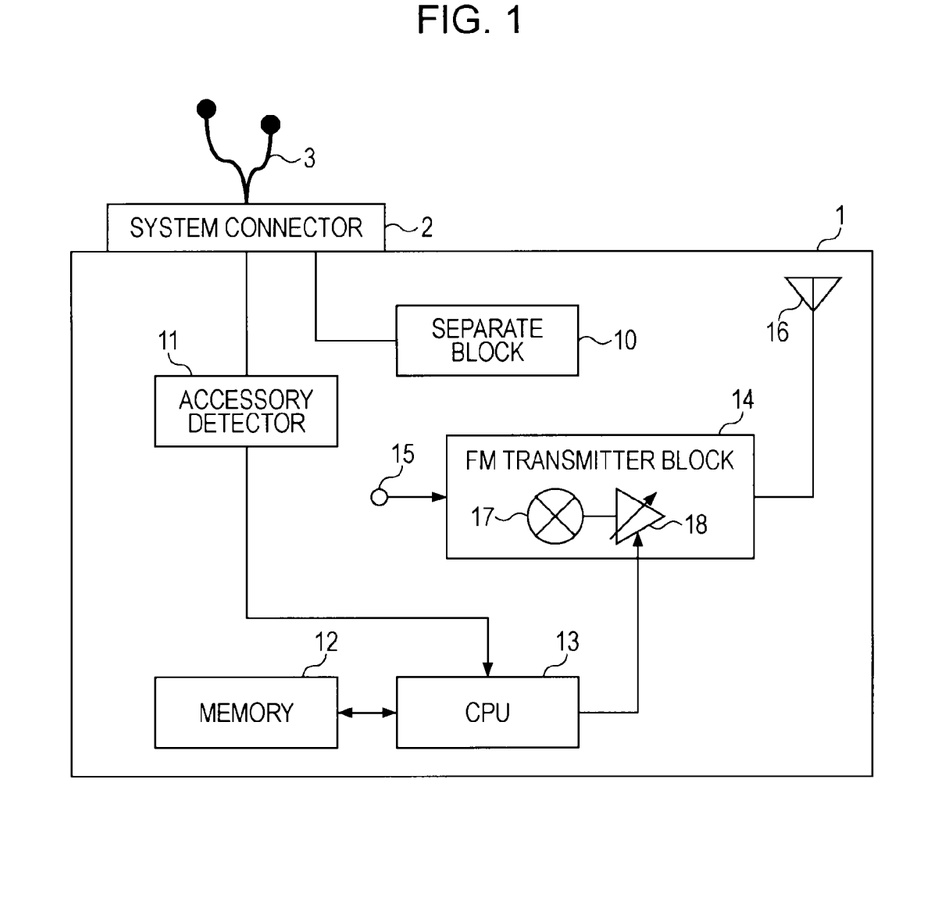
FIG. 1 is a block diagram illustrating a schematic configuration of a main part of a mobile telephone terminal according to a first embodiment of the present invention.

FIG. 1 illustrates a schematic configuration of a mobile telephone terminal 1 according to a first embodiment. In this regard, a mobile telephone terminal according to the first embodiment includes all the components included in a general mobile telephone terminal. However, some of the components are not shown in FIG. 1, and only the configuration of main parts related to the present invention are shown.

In the mobile telephone terminal 1, shown in FIG. 1, according to the present embodiment, a system connector 2 is a connector to which various accessory devices 3, for example, an earphone, a hands-free set, a battery charger, a USB cable, etc., can be connected. The accessory device 3 has a device main unit and an external connector, and has a configuration in which the device main unit and the external connector are connected with a cable. In the present embodiment, the external connector of the accessory device 3 is connected to the system connector 2 of the mobile telephone terminal 1.

A separate block 10 is a set of components (for example, various components, such as a communication circuit and an antenna for communicating with a mobile terminal network, an audio processing circuit, an image processing circuit, a display, etc.), which are represented as one block, excluding the components related to the present invention among all the components included in the mobile telephone terminal 1.

An FM transmitter block 14 has a modulator 17 performing FM-modulation on an audio signal supplied from an audio processing circuit, not shown in the figure, through a terminal 15 and a variable gain amplifier (VGA) 18 adjusting the transmission level of the FM audio signal having been subjected to the FM modulation by the modulator 17. In this regard, in FIG. 1, components, such as a local oscillator, a PLL circuit, etc., normally included in an FM transmitter, are not shown in the figure. Also, the audio signal supplied from the terminal 15 is any one of the audio signals that are selected by the user and are instructed to be transmitted from the FM transmitter among various audio signals, for example, such as a playback music signal, a radio sound signal, a television audio signal, etc.

The FM audio signal output from the FM transmitter block 14 is externally radiated from an FM antenna 16 built in the mobile telephone terminal 1 as an FM radio wave.

In this regard, the FM transmitter block 14 and the FM antenna 16 are built in the mobile telephone terminal 1, and thus share ground, etc., with the separate block 10 as a matter of course.

Here, a factory setting value of the transmission level of the FM transmitter block 14 of the mobile telephone terminal 1 is set to a predetermined level value (in the following, referred to as a default power value) in a state in which the accessory device 3, etc., are not connected to the system connector 2. Specifically, the default power value is set so that a maximum transmission level is obtained within a range of not violating the Radio Law.

Accordingly, when there is a change in a use state of the mobile telephone terminal 1, that is to say, for example, when the accessory device 3 is connected to the system connector 2 of the mobile telephone terminal 1, the transmission level might change by a change in the antenna gain of the FM antenna 16. That is to say, if the accessory device 3 is connected to the system connector 2, ground of the mobile telephone terminal 1 is also connected to the cable of the accessory device 3 through the system connector 2. The connected cable affects the antenna gain of the FM antenna 16, and thus a radiation level of the FM antenna 16 varies (that is to say, the transmission level changes). In particular, if the transmission level becomes greater than the level specified by the Radio Law, a problem of violating the Radio Law arises. On the contrary, if the transmission level lowers, and the signal transmission quality deteriorates, the availability for the user unfavorably decreases. In this regard, examples of simultaneous use of the transmission of the FM audio signal by the FM transmitter and the accessory device 3 are as follows. One example is the case of listening to a music using a hands-free set and, at the same time, transmitting a music signal from the FM transmitter to another radio receiver, etc. Another example is the case of charging the mobile telephone terminal 1 by a battery charger, and at the same time, transmitting a music signal from the FM transmitter to another radio receiver, etc.

In order to address such problems, the mobile telephone terminal 1 according to the first embodiment of the present invention has a configuration described below.

An accessory detector 11 is connected to the system connector 2, and monitors a connection of the accessory device 3 to the system connector 2. That is to say, the accessory detector 11 is monitoring a change in resistance which arises when an external connector, etc., of the accessory device 3 is connected to the system connector 2. When the accessory detector 11 detects a change in resistance, which arises by a connection of some kind of the accessory device 3 to the system connector 2, the accessory detector 11 transmits a value indicating the change in the resistance to a CPU (Central Processing Unit) 13.

When the CPU 13 receives the value indicating the change in the resistance from the accessory detector 11, the CPU recognizes the connection of the accessory device 3 to the system connector 2 by the change in the resistance. Also, the CPU recognizes what type of accessory device 3 is connected by the amount of change in the resistance, for example. That is to say, the CPU 13 is monitoring a change in the use state of the mobile telephone terminal 1, such as the connection of the accessory device 3 to the system connector 2.

In this regard, the accessory detector 11 may receive, for example, a specific ID (identification information) sent from the accessory device 3, and transfers the ID to the CPU 13 in addition to the monitoring of the resistance value as described above.

In that case, the CPU 13 recognizes that the accessory device 3 has been connected to the system connector 2 by receiving the specific ID transferred from the accessory detector 11, and also recognizes the type of the accessory device 3 from the specific ID.

In addition, the accessory detector 11 itself may determine that the accessory device 3 has been connected to the system connector 2 from a change in the resistance of the system connector 2 and the amount of that change, or a specific ID, etc., of the accessory device 3, and may send the information on the connection and the information of the type-determination result to the CPU 13.

When the CPU 13 recognizes the connection of the accessory device 3 to the system connector 2 as described above, and also recognizes the type of the accessory device 3, the CPU 13 refers to information provided in a memory 12 in advance.

Here, the information provided in the memory 12 is, for example a look-up table in which a type of accessory device and an adjustment value of a transmission level for each type of the accessory device are related. The adjustment value of the transmission level corresponds to a difference value (that is to say, the variation of the radiation level of the antenna) for the default power value of the FM transmitter block 14. Specifically, the adjustment value of the transmission level is a gain adjustment value of the variable gain amplifier 18. That is to say, to put it another way, a gain adjustment value described in the look-up table in the memory 12 is a difference value from the default gain value of the variable gain amplifier 18 when the transmission level of the FM transmitter block 14 becomes the default power value. More specifically, if the type of the accessory device 3 connected to the system connector 2 is a device 3 which raises the transmission level of the FM transmitter block 14 (namely, raises the antenna gain of the FM antenna 16), for example, the adjustment value is set to lower the gain of the variable gain amplifier 18 by the amount corresponding to the amount of change in the transmission level. On the contrary, if the type of the accessory device 3 connected to the system connector 2 is a device 3 which lowers the transmission level of the FM transmitter block 14 (lowers the antenna gain of the FM antenna 16), for example, the adjustment value is set to raise the gain of the variable gain amplifier 18 by the amount corresponding to the amount of change in the transmission level.

Next, the CPU 13 adjusts the variable gain amplifier 18 of the FM transmitter block 14 by the gain adjustment value referenced from the memory 12 on the basis of the type of the accessory device 3. Accordingly, if the gain adjustment value referenced from the memory 12 is, for example, an adjustment value lowering the gain of the variable gain amplifier 18, the transmission level of the FM transmitter block 14 is lowered. On the other hand, if the gain adjustment value referenced from the memory 12 is, for example, an adjustment value raising the gain of the variable gain amplifier 18, the transmission level of the FM transmitter block 14 is raised.

Thus, by the mobile telephone terminal 1 according to the present embodiment, even if the accessory device 3 is connected to the system connector 2, the transmission level of the FM transmitter block 14 can be substantially matched with the default power value. That is to say, by the present embodiment, even in the case where variation of the transmission characteristic occurs, such as a change in the transmission level of the FM transmitter block 14 by a change in the use state, such as a connection of the accessory device 3 to the system connector 2, it is possible to perform optimization control of the transmission characteristic so as to substantially match the transmission level with the default power value.

Accordingly, by the present embodiment, even if the accessory device 3 is connected to the system connector 2, variation of the antenna gain of the FM antenna 16 is substantially restrained. Thus, the transmission level will not become greater than the level specified by the Radio Law, and on the contrary, the availability for the user will not decrease by the deterioration of the signal transmission quality caused by a decrease in the transmission level. That is to say, in the present embodiment, the transmission power is controlled in accordance with the type of the accessory device 3 connected to the system connector 2, and thus it is possible to ensure usability while conforming to the Radio Law. Also, it is not necessary to set a use limit on the accessory device 3, and thus it becomes possible to cover various cases.

In addition, by the present embodiment, in particular, for a UMTS (Universal Mobile Telecommunications System) terminal/GSM (Global System for Mobile Communications) terminal, it becomes possible to restrict an SAR (Synthetic Aperture Radar) value in response to the connection of the accessory device 3. Thus, there is an advantage of reducing an adverse effect on a human body.

Processing Flow of First Embodiment

Figure 2:
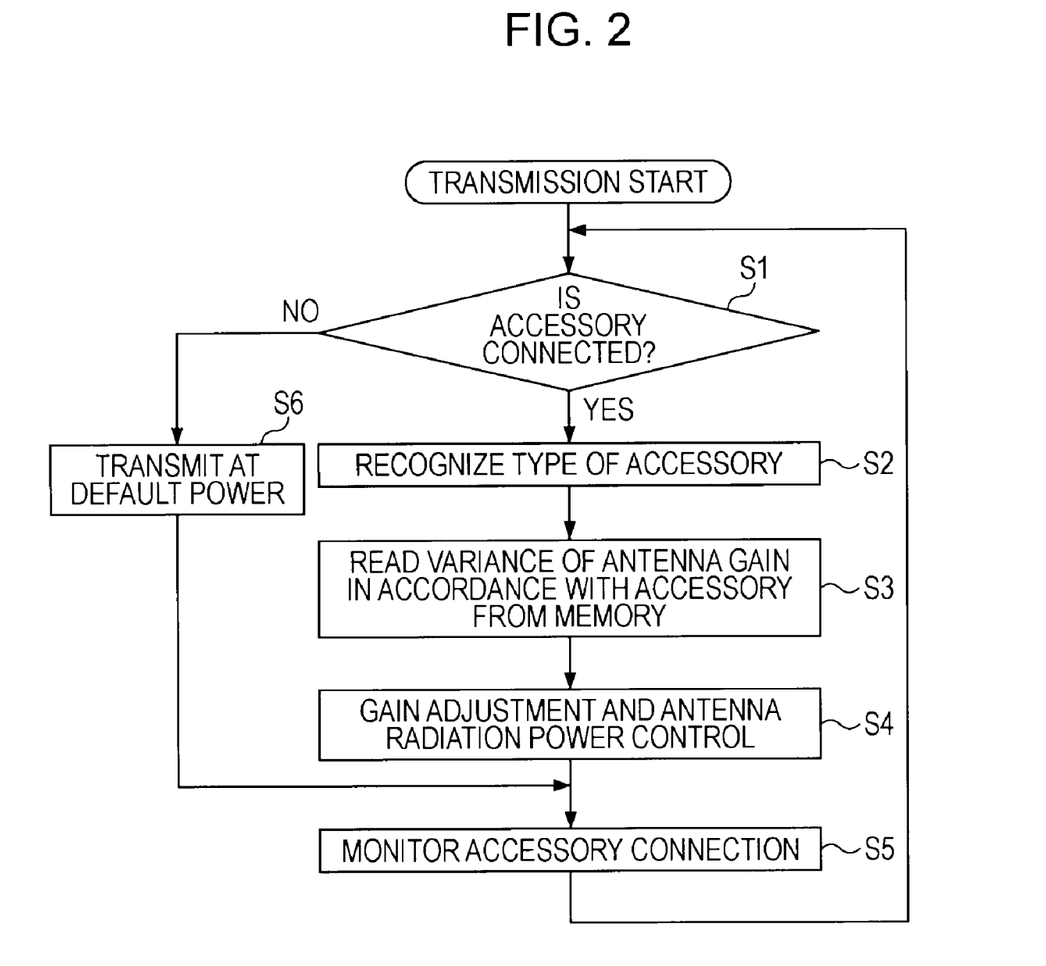
FIG. 2 is a flowchart of connection monitoring processing of an accessory device and transmission-power control processing at accessory device connection time in the first embodiment.

FIG. 2 is a flowchart of connection monitoring processing of the accessory device 3 to the system connector 2, and transmission-power control processing at the time of connecting the accessory device 3 in the mobile telephone terminal 1 according to the first embodiment. In this regard, here, a description will be given, as an example, of the case where the accessory detector 11 monitors the connection of the accessory device 3, and the CPU 13 determines the type of the accessory device 3.

In FIG. 2, when processing for transmitting the FM audio signal from the FM transmitter block 14 is started, the accessory detector 11 monitors whether the accessory device 3 has been connected to the system connector 2 as processing of step S1. If the accessory device 3 is not connected to the system connector 2, the accessory detector 11 informs the CPU 13 of that fact. In this case, the CPU 13 sets the variable gain amplifier 18 of the FM transmitter block 14 to the default gain value. Thus, the transmission power of the FM transmitter block 14 becomes the default power value, and the FM antenna 16 transmits the FM audio signal at the default power value. After that, the accessory detector 11 continues to monitor the connection of the accessory device 3 as processing of step S5.

On the other hand, if the accessory device 3 is connected to the system connector 2, the CPU 13 recognizes the type of the accessory device 3 on the basis of a signal, such as variation in resistance, a specific ID of the accessory device, or the like which is sent from the accessory detector 11 as processing of step S2.

Next, the CPU 13 refers to the look-up table in the memory 12 as processing of step S3, and thereby reads out a gain adjustment value corresponding to the variation of the antenna gain corresponding to the type of the accessory device 3.

Next, the CPU 13 controls the antenna radiation power of the FM antenna 16 by adjusting the variable gain amplifier 18 of the FM transmitter block 14 using the gain adjustment value as processing of step S4. After that, the accessory detector 11 continues to monitor the connection of the accessory device 3 as processing of step S5.

Schematic Configuration of Second Embodiment

Figure 3:
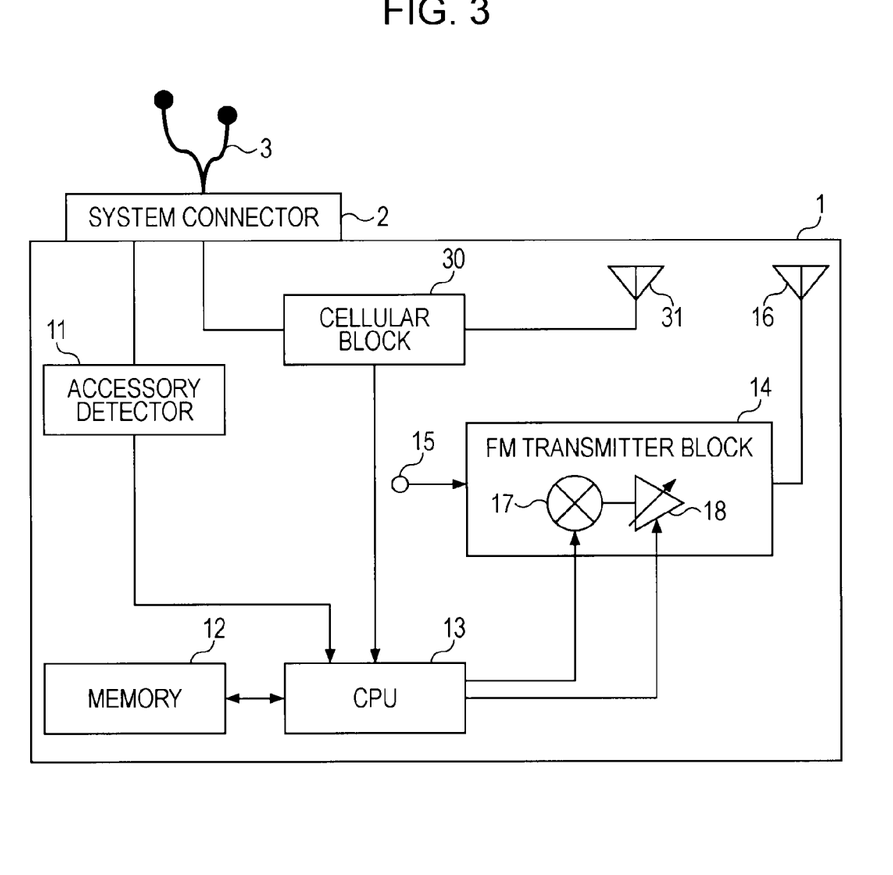
FIG. 3 is a block diagram illustrating a schematic configuration of a main part of a mobile telephone terminal according to a second embodiment of the present invention.

FIG. 3 illustrates a schematic configuration of a mobile telephone terminal 1 according to a second embodiment. In this regard, the mobile telephone terminal according to the present embodiment includes all the components included in a general mobile telephone terminal. However, some of the components are not shown in FIG. 3, and only the configuration of main parts related to the present invention are shown. Also, in FIG. 3, the components that are substantially the same as those in FIG. 1 are marked with the same reference marks as those in FIG. 1, and the detailed descriptions thereof will be omitted.

In the mobile telephone terminal 1, shown in FIG. 3, according to the present embodiment, a cellular block 30 is a communication circuit block for connecting to a mobile telephone network of various countries and performing communication through a communication antenna 31 for a mobile telephone network. In this regard, a mobile-telephone communication method may differ for individual countries, and thus the cellular block 30 is capable of supporting mobile-telephone communication methods for the individual countries.

Here, in a terminal which can be used in each country, such as the mobile telephone terminal 1 according to the present embodiment, if a transmitter, such as an FM transmitter, etc., is used, it is necessary to meet standards, such as transmission approval/disapproval, a transmission level, a frequency band, etc., to satisfy the Radio Law of each country and the specifications of each country in addition to transmission power control at the time of connecting the above-described accessory device 3. That is to say, for example, in a country in which transmission by a transmitter, such as an FM transmitter, etc., is prohibited, it is necessary to restrict use of the transmitter itself. Also, in a country in which transmission at a transmission level lower than the default power value is specified, it is necessary to lower the transmission level lower than the default power value. On the contrary, in a country in which transmission at a transmission level higher than the default power value is specified, it is possible to raise the transmission level higher than the default power value. Also, this is the same for a transmission frequency width by a transmitter, such as an FM transmitter, etc., and it becomes necessary to satisfy the standards of each country. In this regard, in the case where standards, such as approval/disapproval of transmission, a transmission level, a frequency band, etc., are specified by the Radio Law not for each country, but for each area, it is necessary to satisfy the standards for the each area. In the present embodiment, a description will be given by taking each country as an example.

In order to address such problems, the mobile telephone terminal 1 according to the second embodiment of the present invention has a configuration described below.

When the cellular block 30 communicates with a base station of a mobile telephone network of a country in which the mobile telephone terminal 1 is used, the cellular block 30 obtains an identification code of that country, and transfers the country identification code to the CPU 13. Thus, the CPU 13 recognizes the country in which the mobile telephone terminal 1 is used. The cellular block 30, the FM transmitter block 14, and the FM antenna 16 are built in the mobile telephone terminal 1, and thus they all share ground as a matter of course.

In this regard, if the mobile telephone terminal 1 is out of a base-station zone, and thus the CPU 13 fails to obtain the country identification code at the present time, the CPU 13 recognizes the country in which the mobile telephone terminal 1 is used by the country identification code obtained last time and held in the memory 12, etc. In addition, for example, it is possible to recognize a country in which the mobile telephone terminal 1 is used by referring to latitude and longitude information of the current position obtained by a GPS function, not shown in the figure, and latitude and longitude information of each country.

When the CPU 13 recognizes a country in which the mobile telephone terminal 1 is used as described above, the CPU refers to information provided in the memory 12 in advance.

In the case of the second embodiment, in addition to the above-described look-up table of the accessory device and the transmission-level adjustment value, the memory 12 is provided with look-up tables in which each country identification code is related to transmission approval/disapproval information of each country, the transmission level value specified by the Radio Law of each country, the frequency band specified by the Radio Law of each country, etc.

That is to say, look-up tables with respect to each country in the memory 12 according to the present embodiment include, for example, a look-up table in which each country identification code and transmission approval/disapproval specified by the Radio Law of each country are related, a look-up table in which each country identification code and specified transmission power (specifically, the difference between the default power value and a specified transmission level value for each country) of the Radio Law of each country are related, and a look-up table in which each country identification code and specified transmission frequency band (or the difference between the default transmission frequency band and transmission frequency band for each country) of the Radio Law of each country identification code are related.

More specifically, in the case of the present embodiment, the CPU 13 controls transmission approval/disapproval as follows by referring to the look-up table in which each country identification code and transmission approval/disapproval specified by the Radio Law of each country are related. If "transmission approval" is specified in a country in which the mobile telephone terminal 1 is used, the CPU 13 allows transmission from the FM transmitter block 14. If "transmission disapproval" is specified in a country in which the mobile telephone terminal 1 is used, the CPU 13 stops the FM transmitter block 14 to prohibit transmission. Also, the CPU 13 controls transmission power as follows by referring to the look-up table in which each country identification code and transmission power specified by the Radio Law of each country are related. If a transmission power higher than the default power value is allowed by the Radio Law in a country in which the mobile telephone terminal 1 is used, the CPU 13 raises a level of the variable gain amplifier 18 of the FM transmitter block 14 to increase the transmission power (increase up to a maximum transmission level of the Radio Law in that country). On the other hand, if transmission power lower than the default power value is allowed by the Radio Law in a country in which the mobile telephone terminal 1 is used, the CPU 13 lowers a level of the variable gain amplifier 18 of the FM transmitter block 14 to decrease the transmission power (decrease within a maximum transmission level of the Radio Law in that country). Also, the CPU 13 controls, for example, the modulator 17 (or an oscillation frequency of a local oscillator) of the FM transmitter block 14 to match the transmission frequency band and the number of frequency channels to the Radio Law of the country in which the mobile telephone terminal 1 is used by referring to the look-up table in which each country identification code and specified transmission frequency band of the Radio Law of each country are related. In this regard, when controlling the transmission frequency, for example, if a wider frequency band and a larger number of frequency channels are allowed by the Radio Law of the country in which the mobile telephone terminal is used, the CPU 13 controls to increase the wider frequency band and the number of frequency channels up to a maximum.

Thus, the mobile telephone terminal 1 according to the present embodiment can satisfy the standards of the Radio Law in the country in which the mobile telephone terminal 1 is used. That is to say, by the present embodiment, even if it becomes necessary to change the transmission characteristic of the FM transmitter block 14 by a change in a use state, such as a change of a country in which the mobile telephone terminal is used, it is possible to perform optimization control of the transmission characteristic.

Accordingly, by the present embodiment, for example, in a country in which use of a transmitter, such as an FM transmitter, etc., is prohibited, it is possible to prevent transmission, namely, violation of the Radio Law. Also, in a country in which use of a transmitter is allowed, it becomes possible to perform transmission at a maximum transmission level specified by the Radio Law in that country. In particular, in a country in which a maximum transmission level is set to be higher than the default power value, it is possible to extend a transmission distance farther than that of the case of transmitting at the default power value, thereby allowing improvement in the availability of the user. Also, in a country in which use of a transmitter is allowed, it becomes possible to transmit at the transmission frequency band specified by the Radio Law of that country. In particular, in a country in which the transmission frequency band is wide, and a large number of transmission frequency channels are allowed, it becomes possible to communicate a larger amount of information at a high speed using those frequencies. That is to say, in the present embodiment, by performing transmission control in accordance with the Radio Law of each country, it is possible to conform to the Radio Law of each country and, at the same time, to ensure the usability even in the case of changing the country in which the mobile telephone terminal 1 is used.

Processing Flow of Second Embodiment

Figure 4:
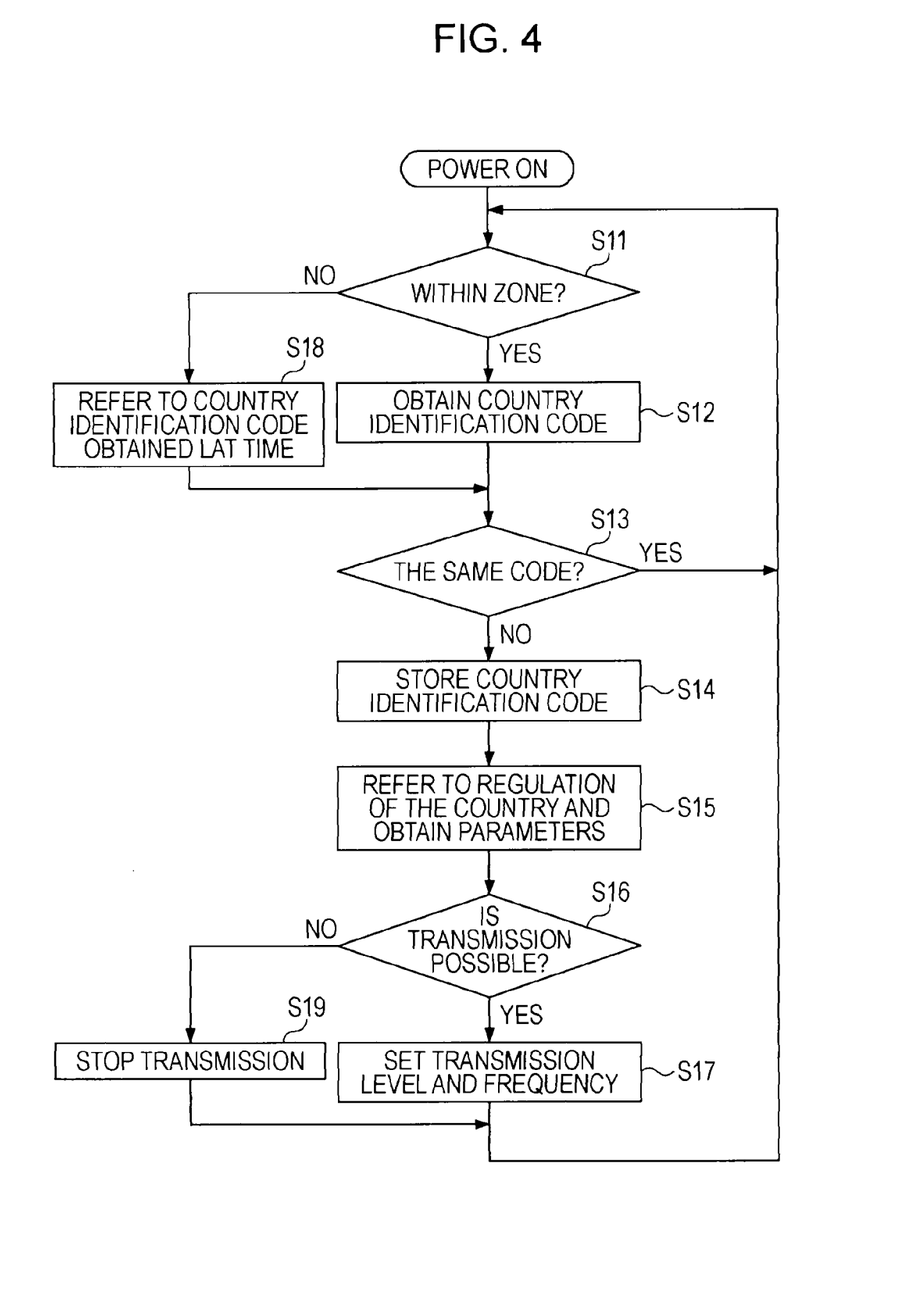
FIG. 4 is a flowchart of recognition processing of a use country and transmission control processing in accordance with the Radio Law of each country in the second embodiment.

FIG. 4 is a flowchart of recognition processing of a use country, and transmission control processing in accordance with the Radio Law of each country in the mobile telephone terminal 1 according to the second embodiment. In this regard, here, a description will be given, as an example, of the case where the CPU 13 determines a use country by a country identification code, and sets transmission approval/disapproval, a transmission level, and a frequency in accordance with the use country. In this regard, in FIG. 4, a control flow at the time of connecting an accessory is omitted.

In FIG. 4, the cellular block 30 is monitoring whether the terminal is within a base station zone as processing of step S11. If the terminal is within the zone, the cellular block 30 obtains a country identification code by the communication with the base station as processing of step S12, and sends the obtained country identification code to the CPU 13.

On the other hand, if the terminal is out of the zone, the cellular block 30 informs the CPU 13 of the fact. In this case, the CPU 13 reads out the country identification code held in the memory 12 as processing of step S18.

Next, as processing of step S13, the CPU 13 determines whether the country identification code obtained in step S12 or the country identification code read out in step S18 is the same as the country identification code recognized immediately before obtaining the country identification code is in step S12 or in step S18. If it is the same, the processing returns to step S11. If it is different, processing proceeds to step S14, and the country identification code is stored in the memory 12.

Next, the CPU 13 proceeds to processing of step S15. The CPU 13 refers to the above-described look-up table specified by the Radio Law of the country and provided in the memory 12 on the basis of the country identification code obtained in step S12 or step S18 to obtain parameters, such as the approval/disapproval information, the transmission level, and the transmission frequency, etc., which are specified by the Radio Law of that country.

Next, the CPU 13 determines whether transmission from a transmitter, such as an FM transmitter, etc., is allowed by the Radio Law of that country as processing of step S16 by checking the parameters referenced from the look-up table.

If the CPU 13 determines that transmission is not allowed, as processing of step S19, the CPU 13 stops the FM transmitter block 14 to prohibit transmission, and returns processing to step S11.

On the other hand, if the CPU 13 determines that transmission is allowed, as processing of step S17, the CPU 13 sets the transmission level and the transmission frequency in accordance with the parameters referenced from the look-up table. Thus, the FM transmitter block 14 performs transmission at the transmission level and the transmission frequency that have been set. After that, the CPU 13 returns the processing to step S11.

Schematic Configuration of Third Embodiment

Figure 5:
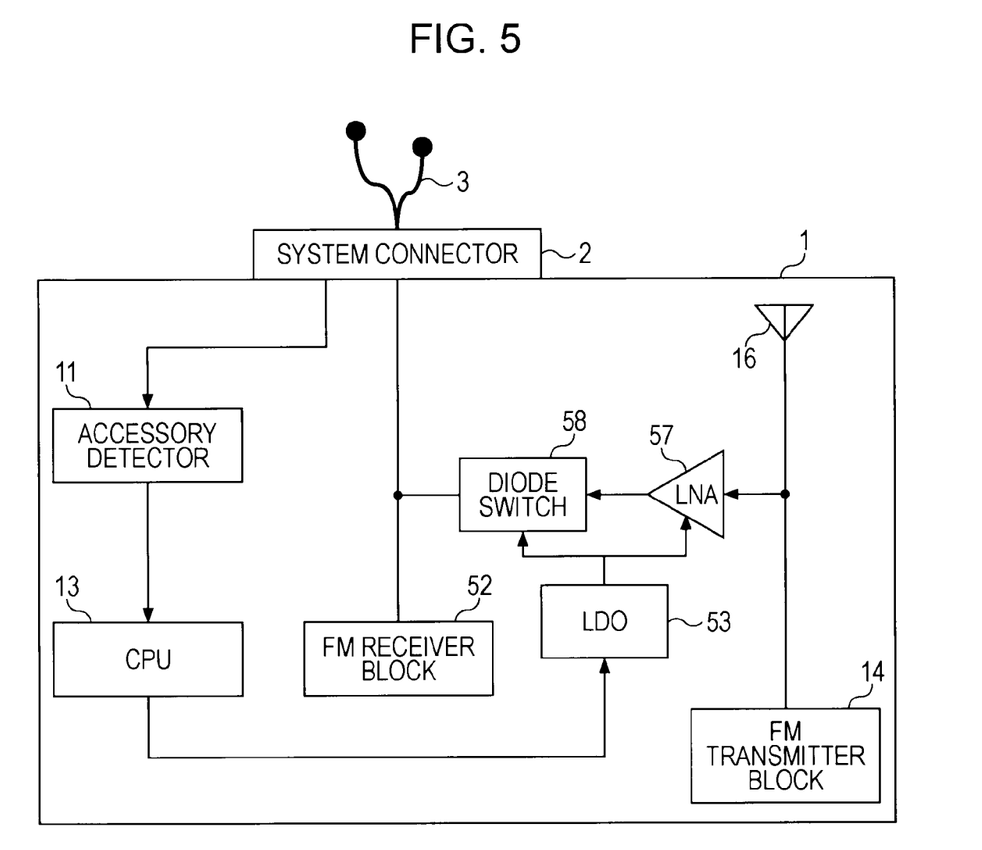
FIG. 5 is a block diagram illustrating a schematic configuration of a main part of a mobile telephone terminal according to a third embodiment of the present invention.

FIG. 5 illustrates a schematic configuration of a mobile telephone terminal 1 according to a third embodiment. In this regard, the mobile telephone terminal according to the present embodiment includes all the components included in a general mobile telephone terminal. However, some of the components are not shown in FIG. 5, and only the configuration of main parts related to the present invention are shown. Also, in FIG. 5, the components that are substantially the same as those in FIG. 1 are marked with the same reference marks as those in FIG. 1, and the detailed descriptions thereof will be omitted.

In the mobile telephone terminal 1 according to the present embodiment, shown in FIG. 5, an FM receiver block 52 is, for example, an FM radio receiver. The FM receiver block 52 shares the FM antenna 16 with the FM transmitter block 14. An FM audio signal received by the FM receiver block 52 is output to the accessory device 3, such as an earphone connected to the system connector 2. In this regard, the FM receiver block 52, the FM transmitter block 14, and the FM antenna 16 are built in the mobile telephone terminal 1, and thus they all share ground as a matter of course.

Here, as described above, in the mobile telephone terminal 1 having a configuration in which the FM receiver block 52 shares one FM antenna 16 with the FM transmitter block 14, for example, if the accessory device 3, such as an earphone, etc., is connected to the system connector 2 in order to externally output the FM audio signal received by the FM receiver block 52, the antenna gain of the FM antenna 16 changes in the same manner as described in the first embodiment, the transmission level from the FM transmitter block 14 might be changed. Of course, in the present embodiment, it is possible to restrain variation in the transmission power by performing transmission power control of the FM transmitter block 14 in response to the connection of the accessory device 3 in the same manner as the case of the first embodiment described before. However, as in the present embodiment, in particular, when the FM receiver block 52 (receiver) shares one FM antenna 16 with the FM transmitter block 14 (transmitter), it is necessary to restrain variation in the transmission power while ensuring isolation of the FM antenna 16 from the FM transmitter block 14.

In order to address such problems, the mobile telephone terminal 1 according to the third embodiment of the present invention has a configuration described below.

In the mobile telephone terminal 1 according to the present embodiment, a low noise amplifier (LNA) 57 and a diode switch 58 are disposed between the FM antenna 16 and the FM receiver block 52. A low dropout regulator (LDO) 53 supplies source power to the low noise amplifier 57 and the diode switch 58.

In the present embodiment, when the mobile telephone terminal 1 is in an operation mode of transmitting an FM audio signal from the FM transmitter block 14, if the CPU 13 receives information that the accessory device 3 has been connected from the accessory detector 11, the CPU 13 controls the low dropout regulator 53 to stop the supply of the source power to the low noise amplifier 57, and turns OFF the diode switch 58. In this regard, in the mode of transmitting the FM audio signal from the FM transmitter block 14, a path for the receiver may be disconnected all the time regardless of whether the accessory device 3 is connected or not.

That is to say, in the present embodiment, when the accessory device 3 is connected to the system connector 2, if there is a change in the use state so as to cause the FM transmitter block 14 to transmit an FM audio signal, it is possible to ensure conformity to the Radio Law and the usability by performing optimum control of the transmission characteristic in order to prevent variation of the transmission power caused by the connection of the accessory device 3 while ensuring isolation of the FM antenna 16 from the FM transmitter block 14 by disconnecting a path (path used by the receiver) from the FM antenna 16 to the FM transmitter block 14.

Processing Flow of Third Embodiment

Figure 6:
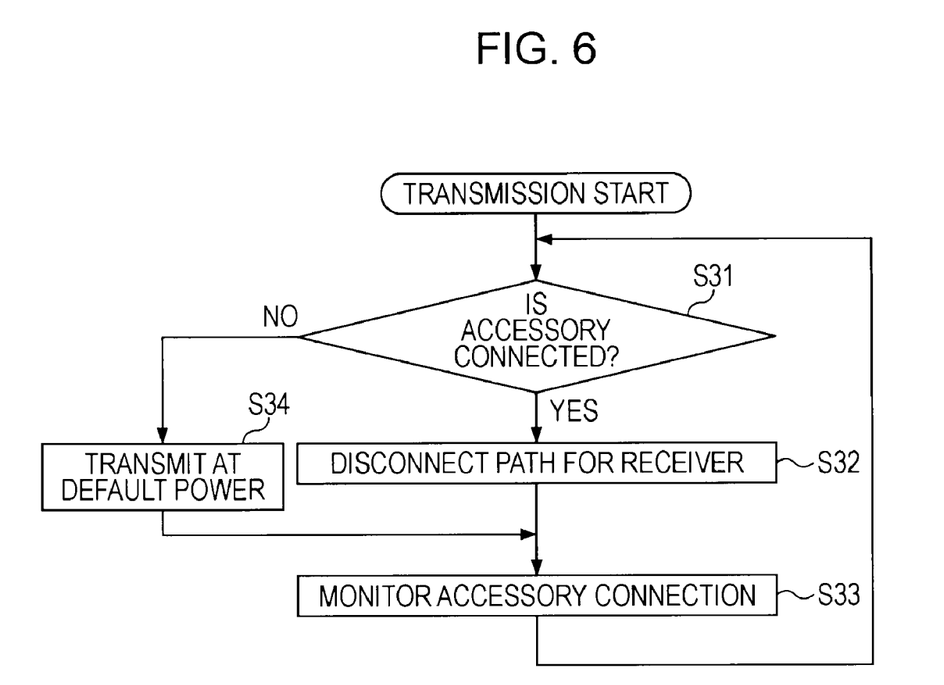
FIG. 6 is a flowchart of connection monitoring processing of an accessory device and receiver-path disconnection processing at accessory device connection time in the third embodiment.

FIG. 6 is a flowchart of connection monitoring processing of the accessory device 3 to the system connector 2, and receiver-path disconnection processing at the time of connecting the accessory device 3 in the mobile telephone terminal 1 according to the third embodiment. In this regard, in FIG. 6, a transmission power control flow at the time of connecting an accessory is omitted.

In FIG. 6, when processing for transmitting the FM audio signal from the FM transmitter block 14 is started, the accessory detector 11 monitors whether the accessory device 3 is connected to the system connector 2 as processing of step S31. If the accessory device 3 is not connected to the system connector 2, the accessory detector 11 informs the CPU 13 of that fact. In this case, the CPU 13 sets the variable gain amplifier 18 of the FM transmitter block 14 to the default gain value. Thus, the transmission power of the FM transmitter block 14 becomes the default power value, and the FM antenna 16 transmits the FM audio signal at the default power value. After that, the accessory detector 11 continues to monitor the connection of the accessory device 3 as processing of step S33.

On the other hand, if the CPU 13 receives information that the accessory device 3 is connected to the system connector 2, as processing of step S32, the CPU 13 controls the low dropout regulator 53 to stop the supply of the source power to the low noise amplifier 57, and turns OFF the diode switch 58, thereby disconnecting a path between the FM receiver block 52 and FM antenna 16. After that, the accessory detector 11 continues to monitor the connection of the accessory device 3 as processing of step S33.

SUMMARY

By each of the embodiments of the present invention, in the mobile telephone terminal 1 provided with a transmitter, such as an FM transmitter, etc., even if the accessory device 3 is connected to the system connector 2, or the country in which the terminal is used is changed, or the like, it is possible to adjust the transmission level of the FM transmitter block 14 to an optimum level (most efficient level) while conforming to the Radio Law. Also, it becomes possible to reduce variation in the availability for the user and to ensure high usability.

The present application contains subject matter related to that disclosed in Japanese Priority Patent Application JP 2008-096663 filed in the Japan Patent Office on Apr. 2, 2008, the entire contents of which is hereby incorporated by reference.

In this regard, the above descriptions of the embodiments are examples of the present invention. The present invention is therefore not limited to the above-described embodiments. As a matter of course, it is possible to make various modifications depending on design requirements and other factors insofar as they are not departing from the spirit and scope of the present invention.

What is claimed is:

1. A mobile communication terminal comprising:
   a signal transmission section having a predetermined default value for a transmission characteristic;
   an antenna to be used at least by the signal transmission section;
   a separate circuit section sharing ground with the signal transmission section and the antenna, and being different from the signal transmission section;
   a monitoring section monitoring a change in a use state of the terminal related to the separate circuit section; and when the signal transmission section transmits a signal using the antenna, if the monitoring section detects a change in the use state of the terminal, a transmission-characteristic adjusting section adjusting a transmission characteristic of the signal transmission section from the default value to a characteristic optimized for the use state.

2. The mobile communication terminal according to claim 1,
wherein the monitoring section monitors a change in a use state caused by a connection of an external accessory to the separate circuit section, and
the transmission-characteristic adjusting section adjusts the transmission characteristic of the signal transmission section in accordance with a difference between the transmission characteristic of the signal transmission section and the antenna to be changed by the connection of the external accessory to the separate circuit section, and the default value.

3. The mobile communication terminal according to claim 2,
wherein the transmission-characteristic adjusting section adjusts transmission power characteristic of the signal transmission section in accordance with a difference between the transmission power characteristic of the signal transmission section and the antenna to be changed by the connection of the external accessory to the separate circuit section, and a default transmission-power characteristic determined as the default value in advance.

4. The mobile communication terminal according to claim 1,
wherein the separate circuit section obtains information indicating a use country or a use region of the terminal,
the monitoring section monitors a change in the use state of the terminal by a change in the information indicating a use country or a use region obtained by the separate circuit section, and
when the monitoring section detects a change in the information indicating a use country or a use region, the transmission-characteristic adjusting section adjusts a transmission characteristic of the signal transmission section from the default value to a characteristic optimized for the use state in the use country or the use region.

5. The mobile communication terminal according to claim 4,
wherein the transmission-characteristic adjusting section adjusts a transmission power characteristic of the signal transmission section in accordance with a difference between the transmission power characteristic of the signal transmission section and the antenna having been determined for the use country or the use region, and a default transmission power characteristic determined as the default value in advance.

6. The mobile communication terminal according to claim 4,
wherein the transmission-characteristic adjusting section adjusts a transmission frequency characteristic of the signal transmission section and the antenna from the default transmission frequency characteristic determined as the default value in advance to a transmission frequency characteristic of the signal transmission section and the antenna determined for the use country or the use region.

7. The mobile communication terminal according to claim 1,
wherein the separate circuit section shares the antenna with the signal transmission section,
the monitoring section monitors a change in a use state caused by a connection of an external accessory to the separate circuit section, and
when the monitoring section detects a change in a use state cause by a connection of an external accessory to the separate circuit section, the transmission-characteristic adjusting section adjusts the transmission characteristic by disconnecting a path between the separate circuit section and the antenna.

8. The mobile communication terminal according to claim 7,
wherein the transmission-characteristic adjusting section adjusts transmission characteristic of the signal transmission section in accordance with a difference between the transmission characteristic of the signal transmission section and the antenna to be changed by the connection of the external accessory to the separate circuit section, and the default value.

9. A method of controlling a transmission characteristic of a mobile communication terminal having a signal transmission section having a predetermined default value for a transmission characteristic, an antenna to be used at least by the signal transmission section, and a separate circuit section sharing ground with the signal transmission section and the antenna, and being different from the signal transmission section, the method comprising the steps of:
a monitoring section monitoring a change in a use state of the terminal related to the separate circuit section; and
when the signal transmission section transmits a signal using the antenna, if the monitoring section detects a change in the use state of the terminal, a transmission-characteristic adjusting section adjusting a transmission characteristic of the signal transmission section from the default value to a characteristic optimized for the use state.

* * * * *